(12) United States Patent
Karlsson et al.

(10) Patent No.: US 10,285,121 B2
(45) Date of Patent: May 7, 2019

(54) CELL SELECTION IN A CELLULAR COMMUNICATION NETWORK

(71) Applicant: Sony Corporation, Tokyo (JP)

(72) Inventors: Peter Karlsson, Lund (SE); Zhinong Ying, Lund (SE); Erik Bengtsson, Eslöv (SE); Rickard Ljung, Helsingborg (SE)

(73) Assignee: SONY CORPORATION, Tokyo (JP)

( * ) Notice: Subject to any disclaimer, the term of this patent is extended or adjusted under 35 U.S.C. 154(b) by 167 days.

(21) Appl. No.: 15/037,702

(22) PCT Filed: Oct. 27, 2014

(86) PCT No.: PCT/IB2014/065627
§ 371 (c)(1),
(2) Date: May 19, 2016

(87) PCT Pub. No.: WO2015/083015
PCT Pub. Date: Jun. 11, 2015

(65) Prior Publication Data
US 2016/0302143 A1    Oct. 13, 2016

(30) Foreign Application Priority Data

Dec. 3, 2013   (EP) ..................................... 13195419

(51) Int. Cl.
*H04B 3/36*       (2006.01)
*H04W 4/02*       (2018.01)
(Continued)

(52) U.S. Cl.
CPC .............. *H04W 48/20* (2013.01); *H04B 3/36* (2013.01); *H04B 17/318* (2015.01);
(Continued)

(58) Field of Classification Search
CPC ........ H04B 3/36; H04B 17/318; H04H 20/38; H04J 11/00; H04L 43/16; H04L 69/28;
(Continued)

(56) References Cited

U.S. PATENT DOCUMENTS 6,256,500 B1    7/2001  Yamashita
9,307,502 B1 *  4/2016  Tailor .................. H04W 52/243
(Continued)

FOREIGN PATENT DOCUMENTS

EP       2424321 A1      2/2012
WO    2013025166 A1      2/2013
(Continued)

OTHER PUBLICATIONS

International Search Report and Written Opinion; dated Apr. 2, 2015; issued in International Patent Application No. PCT/IB2014/065627.
(Continued)

*Primary Examiner* — Asad M Nawaz
*Assistant Examiner* — Kai Chang
(74) *Attorney, Agent, or Firm* — Tucker Ellis LLP (57) ABSTRACT

A user equipment (2, 4, 6) receives mobility information representing a time-dependent location change of a mobile cell (11, 21) of a cellular communication network. A cell of a plurality of cells (11, 21, 31) of cellular communication network is selected for the user equipment (2, 4, 6) to camp on. Selecting the cell comprises processing the mobility information to determine whether the user equipment (2, 4, 6) is to camp on the mobile cell (11, 21).

22 Claims, 7 Drawing Sheets

(51) Int. Cl.

| | |
|---|---|
| *H04H 20/38* | (2008.01) |
| *H04J 11/00* | (2006.01) |
| *H04L 12/26* | (2006.01) |
| *H04L 29/06* | (2006.01) |
| *H04W 28/02* | (2009.01) |
| *H04W 4/029* | (2018.01) |
| *H04W 40/00* | (2009.01) |
| *H04W 48/12* | (2009.01) |
| *H04W 48/20* | (2009.01) |
| *H04W 72/10* | (2009.01) |
| *H04W 84/00* | (2009.01) |
| *H04W 88/02* | (2009.01) |
| *H04W 88/08* | (2009.01) |
| *H04B 17/318* | (2015.01) |
| *H04W 4/04* | (2009.01) |

(52) U.S. Cl.
CPC ............ *H04H 20/38* (2013.01); *H04J 11/00* (2013.01); *H04L 43/16* (2013.01); *H04L 69/28* (2013.01); *H04W 4/027* (2013.01); *H04W 4/029* (2018.02); *H04W 4/046* (2013.01); *H04W 28/0268* (2013.01); *H04W 40/005* (2013.01); *H04W 72/10* (2013.01); *H04W 48/12* (2013.01); *H04W 84/005* (2013.01); *H04W 88/02* (2013.01); *H04W 88/08* (2013.01)

(58) Field of Classification Search
CPC ..... H04W 4/027; H04W 4/028; H04W 4/046; H04W 28/0268; H04W 40/005; H04W 48/12; H04W 48/20; H04W 72/10; H04W 84/005; H04W 88/02; H04W 88/08; H04W 4/029
See application file for complete search history.

(56) References Cited

U.S. PATENT DOCUMENTS

| | | | |
|---|---|---|---|
| 9,374,773 B2* | 6/2016 | Cui ................. | H04W 48/18 |
| 9,813,965 B1* | 11/2017 | Edara ............... | H04W 36/30 |
| 2005/0259619 A1* | 11/2005 | Boettle ............. | H04W 36/32 |
| | | | 370/331 |
| 2006/0128394 A1* | 6/2006 | Turina .............. | H04W 16/06 |
| | | | 455/453 |
| 2010/0254294 A1* | 10/2010 | Jerbi ................ | H04L 12/189 |
| | | | 370/312 |
| 2011/0124330 A1 | 5/2011 | Kojima | |
| 2011/0275378 A1* | 11/2011 | Kwon ............... | H04W 72/00 |
| | | | 455/437 |
| 2011/0319081 A1* | 12/2011 | Deivasigamani .... | H04W 48/20 |
| | | | 455/436 |
| 2012/0129532 A1 | 5/2012 | Lim et al. | |
| 2012/0195290 A1* | 8/2012 | Bienas ............. | H04W 24/10 |
| | | | 370/332 |
| 2012/0250578 A1* | 10/2012 | Pani ................. | H04W 48/12 |
| | | | 370/254 |
| 2012/0302240 A1* | 11/2012 | Tamaki ............. | H04W 36/0011 |
| | | | 455/436 |
| 2013/0005344 A1 | 1/2013 | Dimou | |
| 2013/0059589 A1 | 3/2013 | Dalsgaard et al. | |
| 2014/0057635 A1* | 2/2014 | Sergeyev .......... | H04W 48/20 |
| | | | 455/440 |
| 2014/0066074 A1* | 3/2014 | Folke ............... | H04W 36/08 |
| | | | 455/437 |
| 2014/0162636 A1* | 6/2014 | Cui ................. | H04W 48/20 |
| | | | 455/434 |
| 2014/0192781 A1* | 7/2014 | Teyeb .............. | H04W 36/34 |
| | | | 370/331 |
| 2014/0247806 A1* | 9/2014 | Fujimoto ........... | H04W 64/006 |
| | | | 370/331 |
| 2015/0049681 A1* | 2/2015 | Huang .............. | H04W 72/1289 |
| | | | 370/329 |
| 2015/0087301 A1* | 3/2015 | Choudhary ........ | H04W 48/16 |
| | | | 455/434 |

FOREIGN PATENT DOCUMENTS

| | | |
|---|---|---|
| WO | 2013093575 A1 | 6/2013 |
| WO | 2013113365 A1 | 8/2013 |

OTHER PUBLICATIONS

"3rd Generation Partnership Project; Technical Specification Group Radio Access Network; Radio Resource Control (RRC); Protocol specification (Release 11)" 3GPP TS 25.331.

"3rd Generation Partnership Project; Technical Specification Group Radio Access Network; Radio Resource Control (RRC); Protocol specification (Release 11)" 3GPP TS 25.331 V11.To (Sep. 2013); Chapter 10.2.48.

"3rd Generation Partnership Project; Technical Specification Group Radio Access Network; Evolved Universal Terrestrial Radio Access (E-UTRA); Radio Resource Control (RRC); Protocol specification (Release 11)" 3GPP TS 36.331.

"3rd Generation Partnership Project; Technical Specification Group Radio Access Network; Evolved Universal Terrestrial Radio Access (E-UTRA); Radio Resource Control (RRC); Protocol specification (Release 11)" 3GPP TS 36.331 V11.5.0 (Sep. 2013); Chapter 5.2.2.

"3rd Generation Partnership Project; Technical Specification Group Radio Access Network; User Equipment (UE) procedures in idle mode and procedures for cell reselection in connected mode (Release 11)" 3GPP TS 25.304.

"3rd Generation Partnership Project; Technical Specification Group Radio Access Network; User Equipment (UE) procedures in idle mode and procedures for cell reselection in connected mode (Release 11)" 3GPP TS 25.304 V11.4.0 (Sep. 2013).

International Preliminary Report on Patentability; dated Jun. 16, 2016; issued in International Patent Application No. PCT/IB2014/065627.

Chinese Office Action from corresponding Chinese Application No. 201480065722.3, dated Jul. 25, 2018; machine translation provided by foreign agent on Oct. 23, 2018; 11 pages.

* cited by examiner

CELL SELECTION IN A CELLULAR COMMUNICATION NETWORK

TECHNICAL FIELD

The invention relates to methods and devices for cell selection in a cellular communication network. The invention relates in particular to techniques of selecting a cell for a user equipment to camp on when a cellular communication network includes a mobile base station or repeater relay.

BACKGROUND ART

The demand for mobile data and voice communication continues to evidence a significant growth. Examples for wireless communication systems provided to meet the increasing demand for data and voice communication include cellular-based wireless communication networks which have a plurality of cells. In order to meet the ever increasing demand for mobile data and voice communication also under conditions where a user equipment travels, mobile base stations and mobile repeater relays may be provided. Mobile base stations and/or mobile repeater relays may be installed in public transportation vehicles, such as trains, buses, subway trains, or other vehicles, for example, without being limited thereto.

A user equipment may camp on a cell of the cellular communication network which is mobile because the base station or repeater relay serving the cell is mobile. Such mobile cells may increase the risk that cell reselection may need to be carried out more frequently. Movement of the user equipment is no longer the only reason why the user equipment may move out of the coverage area of the mobile cell. Rather, movement of the mobile cell may also cause the user equipment to become located outside of the coverage area of the mobile cell. The relative movement between the mobile base station or repeater relay and the user equipment may require a handover procedure already when the user equipment has camped on a mobile cell for a short time period only.

While handover procedures including cell reselection may be performed to find a new, more appropriate cell for the user equipment to camp on, the cell reselection involves additional signaling. This may be undesirable for various reasons, including the resultant decrease in bandwidth which is available for data and voice communication, and/or the power consumption associated with the signaling, for example.

SUMMARY

There is a need in the art for techniques which address at least some of the shortcomings of conventional cell selection techniques. There is in particular a need for methods, devices and systems which mitigate the risk that a user equipment camps on a mobile cell which can be anticipated to provide coverage for the user equipment for only a short time period.

According to exemplary embodiments of the invention, the user equipment receives and processes mobility information which represents a time-dependent location change of a mobile cell of the cellular communication network. The mobility information may include the current velocity and direction of movement of a base station or repeater relay, for example, or other information from which the velocity and direction of movement of the base station or repeater relay may be established. By processing the mobility information for cell selection and/or cell reselection, the user equipment may selectively prioritize or deprioritize cells depending on the relative velocity between the base station or repeater relay of the respective cell and the user equipment.

According to exemplary embodiments, a method and a user equipment as recited in the independent claims are provided. The dependent claims define further embodiments.

According to an embodiment, a method of selecting a cell of a cellular communication network having a plurality of cells is provided. The method comprises receiving, by a user equipment, mobility information representing a time-dependent location change of a mobile cell of the plurality of cells. The method comprises selecting a cell of the plurality of cells for the user equipment to camp on. The method comprises processing the mobility information to determine whether the user equipment is to camp on the mobile cell.

By utilizing the mobility information which indicates the time-dependent location change of the mobile cell in the cell selection, the risk of the user equipment camping on a cell which moves at a high velocity relative to the user equipment may be mitigated. For a user equipment travelling on a vehicle on which a base station or repeater relay of the mobile cell is installed, the mobility information may be utilized by the user equipment to identify the cell of the cellular communication network which travels jointly with the user equipment. The risk is mitigated that handovers occur at a short time interval after a cell has been selected in an attach procedure.

The user equipment may receive the mobility information while the user equipment is in idle mode and may select the cell while the user equipment is in idle mode.

The method may comprise monitoring user equipment movement data which represent a time-dependent location change of the user equipment. Processing the mobility information of the mobile cell may include performing a comparison of the user equipment movement data with the mobility information.

The user equipment may compute a relative velocity between the user equipment and a base station or a repeater relay of the mobile cell to determine whether the user equipment is to camp on the mobile cell.

The user equipment may select a cell different from the mobile cell for the user equipment to camp on if the relative velocity exceeds a threshold.

The mobility information may include a current velocity and a current direction of movement of the mobile cell.

The user equipment may compare the current velocity of the mobile cell with a current velocity of the user equipment to determine whether the user equipment is to camp on the mobile cell. The user equipment may compare the current a direction of movement of the mobile cell with a current direction of movement of the user equipment to determine whether the user equipment is to camp on the mobile cell.

The mobility information may include information on a time-averaged historical velocity and information on a time-averaged historical direction of movement of the mobile cell.

The user equipment may compare the time-averaged historical velocity of the mobile cell with a time-averaged historical velocity of the user equipment to determine whether the user equipment is to camp on the mobile cell. The user equipment may compare the time-averaged direction of movement of the mobile cell with a time-averaged historical direction of movement of the user equipment to determine whether the user equipment is to camp on the mobile cell.

The user equipment may perform a hard prioritization of cells by selectively discarding the mobile cell depending on the mobility information.

The user equipment may perform a soft prioritization of cells by making a selection of the mobile cell more likely or less likely, depending on the mobility information.

The method may comprise measuring a signal strength indicator and/or a signal quality indicator for the mobile cell. The method may comprise selectively incrementing or decrementing the measured signal strength or signal quality indicator for the mobile cell in dependence on a result of the comparison to generate a movement-dependent signal strength indicator and/or a movement-dependent signal quality indicator which is used to determine whether the user equipment is to camp on the mobile cell.

The user equipment may report the movement-dependent signal strength indicator and/or the movement-dependent signal quality indicator to the cellular communication network for cell reselection. This allows the processing of mobility information to be readily integrated into conventional handover procedures, for example. The mobility information may be used without requiring that adjustments are made to cell reselection procedures performed at a base station, for example.

A base station or repeater relay of the mobile cell may broadcast the mobility information.

The base station or the repeater relay may determine a current velocity and a current direction of movement of the base station or the repeater relay, respectively. The base station may compute a time-averaged velocity and time-averaged direction of movement for a pre-defined time interval before the base station or repeater relay broadcasts the mobility information.

The base station or the repeater relay may generate the mobility information and may broadcast the mobility information as system information. The base station or the repeater relay may broadcast the mobility information as a system information block, SIB.

The base station or the repeater relay may broadcast the mobility information which may include information on a current velocity and a current direction of movement of the base station or of the repeater relay, and information on a historical movement of the base station or of the repeater relay in the past.

According to another embodiment, a user equipment configured to attach to a cellular communication network having a plurality of cells is provided. The user equipment comprises a receiver configured to receive mobility information representing a time-dependent location change of a mobile cell of the plurality of cells. The user equipment comprises at least one processing device coupled to the receiver and configured to select a cell of the plurality of cells to camp on. The at least one processing device is configured to determine, based on the mobility in-formation, whether the user equipment is to camp on the mobile cell.

The user equipment may be configured to receive the mobility information while the user equipment is in idle mode. The user equipment may be configured to select the cell while the user equipment is in idle mode.

The user equipment may be configured to capture and monitor user equipment movement data which represent a time-dependent location change of the user equipment. The user equipment may be configured to perform a comparison of the user equipment movement data with the mobility information to determine whether the user equipment is to camp on the mobile cell.

The user equipment may be configured to compute a relative velocity between the user equipment and a base station or a repeater relay of the mobile cell to determine whether the user equipment is to camp on the mobile cell.

The user equipment may be configured to select a cell different from the mobile cell for the user equipment to camp on if the relative velocity exceeds a threshold.

The mobility information may include a current velocity and a current direction of movement of the mobile cell. The user equipment may be configured to compare the current velocity of the mobile cell with a current velocity of the user equipment to determine whether the user equipment is to camp on the mobile cell. The user equipment may be configured to compare the current direction of movement of the mobile cell with a current direction of movement of the user equipment to determine whether the user equipment is to camp on the mobile cell.

The mobility information may include information on a time-averaged historical velocity and information on a time-averaged historical direction of movement of the mobile cell.

The user equipment may be configured to compare the time-averaged historical velocity of the mobile cell with a time-averaged historical velocity of the user equipment to determine whether the user equipment is to camp on the mobile cell. The user equipment may be configured to compare the time-averaged direction of movement of the mobile cell with a time-averaged historical direction of movement of the user equipment to determine whether the user equipment is to camp on the mobile cell.

The user equipment may be configured to perform a hard prioritization of cells by selectively discarding the mobile cell depending on the mobility information.

The user equipment may be configured to perform a soft prioritization of cells by making selection of the mobile cell more likely when the mobility information indicates that the mobile cell moves in the same direction as the user equipment. The user equipment may be configured to perform a soft prioritization of cells by making selection of the mobile cell less likely when the mobility information indicates that the mobile cell moves opposite to the user equipment.

The user equipment may be configured to measure a signal strength indicator and/or a signal quality indicator for the mobile cell. The user equipment may be configured to selectively increment or decrement the measured signal strength or signal quality indicator for the mobile cell in dependence on a result of the comparison to generate a movement-dependent signal strength indicator and/or a movement-dependent signal quality indicator. The user equipment may be configured to use the movement-dependent signal strength indicator and/or a movement-dependent signal quality indicator to determine whether the user equipment is to camp on the mobile cell.

The user equipment may be configured to report the movement-dependent signal strength indicator and/or the movement-dependent signal quality indicator to the cellular communication network for cell reselection.

According to another embodiment, a system is provided which comprises a cellular communication network and a user equipment. The cellular communication network comprises a plurality of cells including at least one mobile cell. A base station or a repeater relay of the mobile cell is displaceable and is configured to broadcast mobility information which represents a time-dependent location change of the base station or of the repeater relay. The user equipment may be the user equipment according to any one aspect or embodiment disclosed herein.

The base station or the repeater relay of the mobile cell may be configured to determine a current velocity and a current direction of movement of the base station or the repeater relay, respectively. The base station or the repeater relay of the mobile cell may be configured to compute a time-averaged velocity and time-averaged direction of movement for a pre-defined time interval which precedes the broadcasting of the mobility information.

The base station or the repeater relay of the mobile cell may be configured to generate the mobility information and to broadcast the mobility information as system information. The base station or the repeater relay may be configured to broadcast the mobility information as a system information block, SIB.

The base station or the repeater relay may be configured to broadcast the mobility information which may include information on a current velocity and a current direction of movement of the base station or of the repeater relay, and which may further include information on a historical movement of the base station or of the repeater relay in the past.

Embodiments of the invention may be used for cell selection procedures in cellular communication networks, including 3rd generation (3G) or Long Term Evolution (LTE) cellular communication networks. Embodiments of the invention may in particular used when a user equipment becomes attached to the cellular communication network.

Although specific features described in the above summary and the following detailed description are described in the context of specific embodiments and aspects of the invention, the features of the embodiments and aspects may be combined with each other unless specifically noted otherwise.

BRIEF DESCRIPTION OF DRAWINGS

Embodiments of invention will now be described in more detail with reference to the accompanying drawings.

DESCRIPTION OF EMBODIMENTS

In the following, exemplary embodiments of the invention will be described in more detail. It has to be understood that the features of the various exemplary embodiments described herein may be combined with each other unless specifically noted otherwise. Identical or similar reference numerals refer to identical or similar components.

While some embodiments will be described in the context of specific communication standards and techniques, embodiments of the invention are not limited to these particular communication standards but may be used in a wide variety of communication systems.

Figure 1:
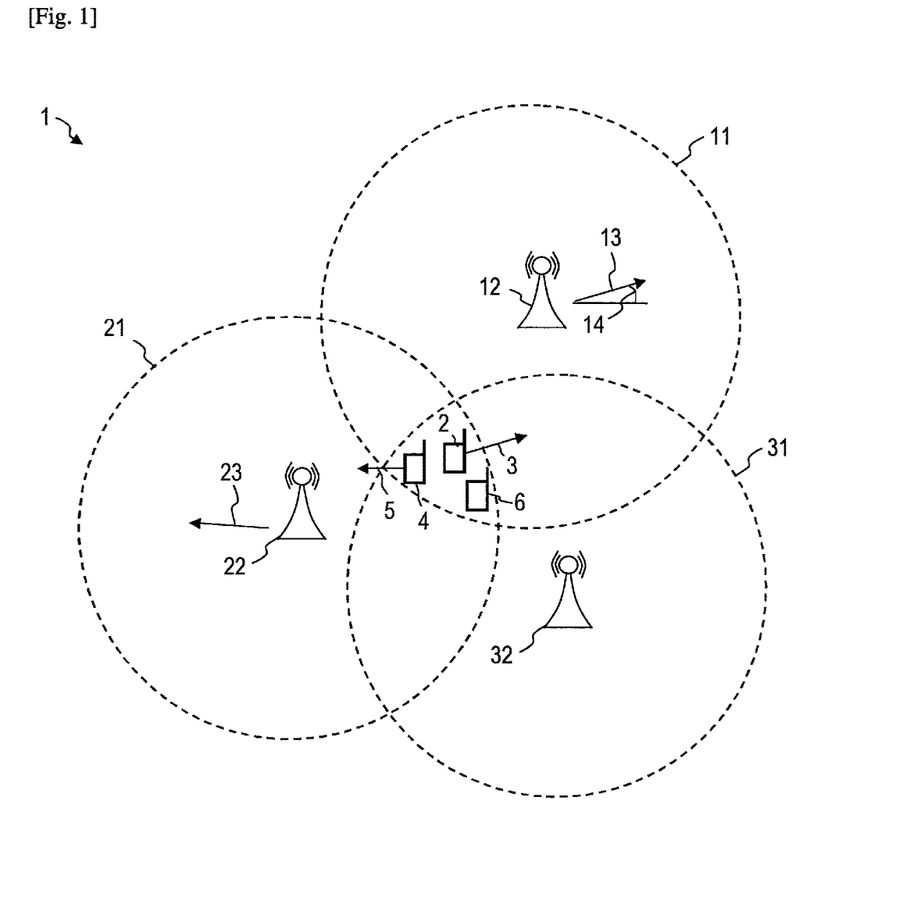
FIG. 1 shows a communication system according to an embodiment.

FIG. 1 shows a communication system 1 according to an embodiment. The communication system 1 is configured as a cellular wireless communication system which has a plurality of cells 11, 21, 31. The communication system 1 may comprise a plurality of base stations. Base stations 12, 22, 32 are exemplarily illustrated in FIG. 1. The communication system 1 may comprise one or several repeater relays. The operation and configuration of the base station which will be explained in more detail below may also be performed by repeater relays. I.e., one or several of the base stations 12, 22, 32 may be replaced by a repeater relay.

The base stations 12, 22, 32 may communicate with each other via wireless radio communications or via an operator core network. The communication network may be a Long Term Evolution (LTE) network. A radio access network (RAN) of the communication network may be an evolved UTRAN (E-UTRAN), with the base stations 12, 22, 32 respectively being an evolved Node B (eNodeB). The base station 12, 22, 32 may be connected to a Mobility Management Entity (MME) and/or Serving Gateway (S-GW) in the core network (CN).

The base station 12 provides a radio cell 11 in which a user equipment 2 may communicate directly with the base station 12 via radio frequency communication. The base station 22 provides a radio cell 21 in which the user equipment 2 may communicate directly with the base station 22 via radio frequency communication. The base station 32 provides a radio cell 31 in which the user equipment 2 may communicate directly with the base station 32 via radio frequency communication. Further user equipments 4, 6 according to embodiments may be provided in the communication network. The user equipment 2, 4, 6 may respectively have a wireless interface for communication with the RAN.

One or several of the cells 11, 21, 31 of the cellular communication network are mobile cells. The base station or repeater relay serving the respective mobile cell is mobile. As the base station or repeater relay moves, the cell 11, 21, 31 also moves. For illustration, the base station or repeater relay of a mobile cell may be installed in a public transportation vehicle, e.g. a bus or a train, or in another vehicle.

A first base station 12 may move at a first velocity indicated by velocity vector 13. A first cell 11 may move jointly with the first base station 12. Boundaries of the first cell 11 may optionally also deform slightly due to shielding effects, for example, as the first base station 12 moves. Generally, as used herein, the movement, velocity and movement direction of a mobile cell may be identical to the movement, velocity and movement direction of the base station or repeater relay of the respective mobile cell.

The movement of the first cell 11 may be defined by the velocity vector 13 in a world reference frame. The velocity vector 13 defines the velocity, e.g. the magnitude of the velocity vector 13, and a movement direction. The movement direction may be defined by an angle 14 relative to a coordinate axis in the world reference frame, for example.

For further illustration, a second base station 22 may move at a second velocity indicated by velocity vector 23. The second cell 21 moves in accordance with the second base station 22. For still further illustration, a third base station 32 may be stationary. The third cell 31 served by the third base station 32 may be stationary.

According to exemplary embodiments, a user equipment may receive mobility information that is broadcast by the base station or repeater relay of a mobile cell. The mobility information may be broadcast by the respective base station or repeater relay as system information, e.g. as a system information block (SIB). The mobility information may include data which allows the user equipment to determine a velocity and movement direction of the base station or repeater relay which broadcasts the mobility information. The mobility information may include data which allows the user equipment to determine a current velocity and a current direction of movement of the base station or repeater relay which broadcasts the mobility information. The mobility information may include data which allows the user equipment to determine a historical time-averaged velocity and a historical time-averaged direction of movement of the base station or repeater relay which broadcasts the mobility information.

The mobility information may take any one of a variety of formats. For illustration rather than limitation, the mobility information may include the two or three components of the velocity vector in a world reference frame. The mobility information may include the magnitude of the velocity vector and an angle which indicates the direction of movement. The mobility information may include the position of the base station or repeater relay recorded at a plurality of times, i.e. two or more than two times, prior to broadcasting the mobility information. The user equipment may process the mobility information to determine the velocity and movement direction of the base station or repeater relay which broadcasts the mobility information.

The user equipment may compare the velocity and direction of movement of the base station or repeater relay to the velocity and direction of movement of the user equipment. Mobile cells may be selectively prioritized or deprioritized when a cell selection is performed. In particular, when the user equipment becomes attached to the cellular communication network, the user equipment may take the broadcast mobility information into account in cell selection. Moving cell(s) may be selectively be prioritized or deprioritized over stationary cells or other moving cells, depending on whether the base station or repeater relay moves in a direction and at a velocity similar to that of the user equipment.

For illustration, the user equipment 2 moves with a velocity indicated by velocity vector 3 when a cell selection is performed in an attach procedure. The user equipment 2 may be located in the coverage area of a first base station 12. The user equipment 2 may optionally be located in the coverage area of at least one further base station or repeater relay 22, 32. The user equipment 2 may receive the mobility information from the first base station 12 and, optionally, the second base station 22 while the user equipment 2 is in idle mode.

The user equipment 2 may use the mobility information to select a cell to camp on. The user equipment 2 may prioritize the first cell 11 over the second cell 21 and the third cell 31, even when the signal strength of the first base station 12 measured by the user equipment 2 is less than that of the second base station 22 and/or the third base station 32. The user equipment 2 may prioritize the first cell 11 because the first base station 12 moves with a first velocity vector 13 which is similar in magnitude and direction to the velocity vector 3 of the user equipment 2. The user equipment 2 may compute a relative velocity between the user equipment 2 and each base station or repeater relay which provide coverage at the location at which the user equipment 2 is positioned when attempting to attach to the cellular communication network. The user equipment 2 may prioritize or deprioritize cells based on the magnitude of the relative velocity. For illustration, the user equipment 2 may prioritize the first cell 11 over the second cell 21, because the base station 12 or repeater relay of the first cell 11 has the smallest relative velocity relative to the velocity vector 3 of the user equipment 2.

Other factors may be taken into account in the cell selection or reselection. For illustration, a signal strength indicator and/or signal quality indicator may be used in combination with the mobility information when a cell selection or reselection is performed. The signal quality indicator may be the Cell Selection quality value (typically indicated in dB), which is also referred to as Squal in the art. The signal strength indicator may be the Cell Selection RX level value (typically indicated in dB), which is also referred to as Srxlev in the art.

The other user equipments 4, 6 may also use mobility information broadcast by mobile base stations. The user equipment 4 may prioritize the second cell 21 over the first cell 11 and the third cell 31, because the base station 22 or repeater relay of the second cell 21 has the smallest relative velocity relative to the velocity 5 of the user equipment 4. The user equipment 6 may prioritize the third cell 31 over the first cell 11 and the second cell 21, because the base station 32 or repeater relay of the third cell 31 has the smallest relative velocity relative to the stationary user equipment 6.

Figure 2:
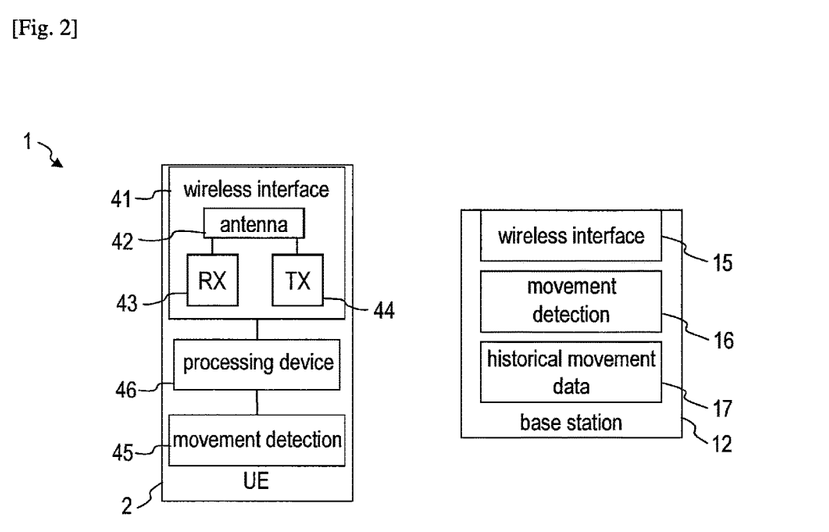
FIG. 2 shows the communication system of FIG. 1, in which a base station of a mobile cell is configured to transmit mobility information.

FIG. 2 is a schematic block diagram of a system 1 according to an embodiment. The base station 12 of the RAN may be connected to a node of the RAN or of the core network (CN). For illustration, for a base station 12 implemented as an eNodeB, the base station 12 may be connected to a MME or S-GW.

The user equipment 2 has a wireless interface 41. The wireless interface 41 may be configured to communicate with the RAN of the cellular communication network. The wireless interface 41 may be configured for communication over the E-UTRA air interface.

The user equipment 2 has a processing device 46 connected to the wireless interface 41. The processing device 46 may comprise one or several microprocessors, one or several microcontrollers, one or several processors, one or several controllers, one or several application specific integrated circuits (ASICs) and/or a combination of such devices.

The processing device 46 may be configured to process mobility information broadcast by a base station and received at the wireless interface 41. The processing device 46 may be configured to use the mobility information when determining on which cell of the communication network the user equipment is to camp.

The user equipment 2 has a movement detection device 45 configured to detect a location change of the user equipment 2. The movement detection device 45 may include one or several of a position sensing device, e.g. a GPS or Galileo sensor, an acceleration sensor, or other known devices configured to detect a location change of the user equipment 2. The movement detection device 45 may be configured to determine the location of the user equipment 2 based on measured signal strengths from stationary or mobile base stations in combination with triangulation techniques, for illustration. The processing device 46 may process an analog or digital output signal of the movement detection device 45. The processing device 46 may be configured to determine a current velocity and a current direction of movement of the user equipment 2 based on the output signal of the movement detection device 45. The processing device 46 may be configured to perform further processing functions, such as computing a time-averaged velocity vector.

The processing device 46 may compare the information on the current and/or historical velocity vector of the base station 12 to the data representing the current and/or historical velocity vector of the user equipment 2. The processing device 46 may compute a relative velocity between the base station 12 and the user equipment 2. The processing device 46 may determine, based on the relative velocity, whether the mobile cell served by the base station 12 is suitable for the user equipment 2 to camp on.

The processing device 46 may perform a prioritization among candidate serving cells. The processing device 46 may be configured to use the mobility information received from one or several mobile base stations or repeater relays for the prioritization. The processing device 46 may perform the prioritization while the user equipment 2 is in idle mode. The processing device 46 may perform the prioritization while the user equipment 2 is in a Radio Resource Control (RRC) disconnected state. The processing device 46 may perform a hard prioritization in which cells are selectively discarded based on the mobility information. An exemplary implementation of such a hard prioritization will be described with reference to FIG. 5. The processing device 46 may perform a soft prioritization in which the likelihood that a cell is selected to camp on is increased or decreased gradually, based on the mobility information. An exemplary implementation of such a soft prioritization will be described with reference to FIG. 6.

The processing device 46 may use the mobility information not only for a cell selection during an attach procedure, but also for a cell reselection, e.g. in a handover procedure. For illustration, the processing device 46 may use the mobility information of several base stations to determine for which base stations a measured signal strength indicator and/or signal quality indicator is to be reported to the RAN for a cell reselection. Alternatively or additionally, the processing device 46 may selectively increment or decrement the measured signal strength indicator and/or signal quality indicator measured for a base station, depending on the relative velocity between the base station and the user equipment 2. The incremented or decremented signal strength indicator and/or signal quality indicator may be reported to the cellular communication network for a cell reselection, for example. The processing device 46 may be configured to control a transmitter path 44 of the wireless interface 41 to report the incremented or decremented signal strength indicator and/or signal quality indicator to the cellular communication network.

The base station 12 includes a wireless interface 15. The wireless interface 15 may be configured for communication over the E-UTRA air interface, for example. The base station 12 may be configured to determine a time-dependent location change of the base station 12. The base station 12 is configured to transmit mobility information which is indicative of the time-dependent location change of the base station 12 over the wireless interface 15.

The base station 12 may be configured to transmit system information which includes the mobility information. The base station 12 may be configured to transmit the mobility information as system information block (SIB). The base station 12 may be configured to transmit the mobility information as SIB message as defined in technical specification 3GPP TS 25.331, entitled "3rd Generation Partnership Project; Technical Specification Group Radio Access Network; Radio Resource Control (RRC); Protocol specification (Release 11)". The base station 12 may be configured to transmit the mobility information as SIB message as defined in chapter 10.2.48 of technical specification 3GPP TS 25.331 V11.7.0 (2013-09), entitled "3rd Generation Partnership Project; Technical Specification Group Radio Access Network; Radio Resource Control (RRC); Protocol specification (Release 11)". The base station 12 may be configured to transmit the mobility information as SIB message as defined in technical specification 3GPP TS 36.331, entitled "3rd Generation Partnership Project; Technical Specification Group Radio Access Network; Evolved Universal Terrestrial Radio Access (E-UTRA); Radio Resource Control (RRC); Protocol specification (Release 11)". The base station 12 may be configured to transmit the mobility information as SIB message as defined in chapter 5.2.2 of technical specification 3GPP TS 36.331 V11.5.0 (2013-09), entitled "3rd Generation Partnership Project; Technical Specification Group Radio Access Network; Evolved Universal Terrestrial Radio Access (E-UTRA); Radio Resource Control (RRC); Protocol specification (Release 11)".

The base station 12 includes a movement detection device 16 configured to detect a location change of the base station 12. The movement detection device 16 may include one or several of a position sensing device, e.g. a GPS or Galileo sensor, an acceleration sensor, or other known devices configured to detect a location change of the base station 12. The movement detection device 16 may be configured to determine the location of the base station 12 by measuring signal strengths of stationary base stations or other mobile base stations of the cellular communication network, in combination with triangulation techniques, for example. The movement detection device 16 may comprise an acceleration sensor. The movement detection device 16 may be configured to compute a velocity vector by integrating measured accelerations. The movement detection device 16 may be configured to perform further processing functions, such as computing a magnitude of a velocity vector and a direction of movement.

The base station 12 includes a storage medium 17 for at least temporarily storing historical information on time-dependent location changes of the base station 12. For illustration, the velocity and movement direction may be stored in regular time intervals in the storage medium 17. The base station 12 may be configured to compute a time-averaged historical velocity and time-averaged historical direction of movement from the data stored in the storage medium 17. Time-averaging may be performed over a time interval having a pre-defined length which precedes the broadcasting of mobility information. Alternatively or additionally, the location of the base station 12 may be stored in regular time intervals in the storage medium 17. The base station 12 may be configured to compute a time-averaged historical velocity and time-averaged historical direction of movement from the locations recorded in the storage medium 17.

The base station 12 may be configured to broadcast mobility information in any one of a variety of formats. The base station 12 may be configured to transmit two or three components of a velocity vector of the base station 12 in a world reference frame. The mobility information may include the magnitude of the velocity vector and one angle or two angles which indicate the direction of movement. The mobility information may include the position of the base station 12 or repeater relay recorded at a plurality of times, i.e. two or more than two times, prior to transmission of the mobility information.

Figure 3:
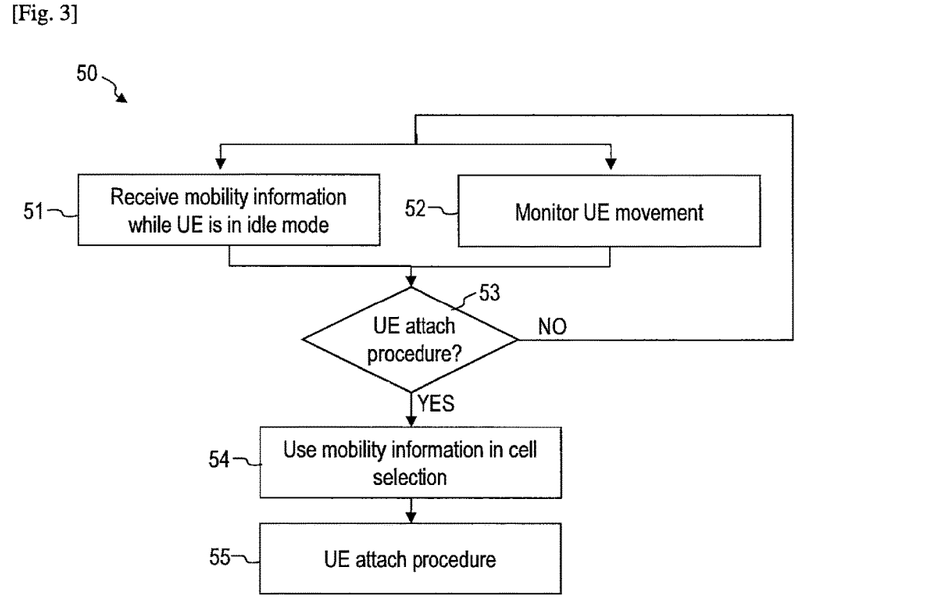
FIG. 3 is a flow chart of a method according to an embodiment.

FIG. 3 is a flow diagram of a method 50 according to an embodiment. The method 50 may be performed by a user equipment according to an embodiment.

At 51, the user equipment receives mobility information from at least one mobile base station or repeater relay. The mobility information represents a time-dependent location change of the mobile cell. The mobility information may include the current velocity and current direction of movement of the base station or repeater relay, or information from which the current velocity and current direction of movement of the base station or repeater relay may be computed. The mobility information may optionally include historical data which are indicative of the movement of the base station or repeater relay in a predefined time window before the mobility information is broadcast by the base station or repeater relay.

At 52, the user equipment monitors a movement of the user equipment. Monitoring the movement of the user equipment may comprise collecting user equipment movement data. The user equipment movement data may include the current velocity and current direction of movement of the user equipment, or information from which the current velocity and current direction of movement of the user equipment may be computed.

Steps 51 and 52 may be performed while the user equipment is in idle mode. Steps 51 and 52 may be performed while the user equipment is in a RRC disconnected state, for example.

At 53, it is determined whether the user equipment shall attach to the communication network. If the user equipment does not need to attach to the communication network, the method may return to steps 51 and 52. If the user equipment shall attach to the communication network, the method may continue at 54.

At 54, the mobility information is used in a cell selection. In the cell selection, a cell is selected for the user equipment to camp on. The mobility information may be combined with the user equipment movement data to determine whether the base station or repeater relay of the mobile cell and the user equipment move with similar velocities and in similar directions. A relative velocity may be computed. The mobile cell may be selected depending on the relative velocity between the user equipment and the base station or repeater relay.

For illustration, and as will be described in more detail with reference to FIG. 4 to FIG. 8, a mobile cell may be prioritized over a stationary cell or another mobile cell when the relative velocity between the user equipment and the mobile cell is small. A mobile cell may be deprioritized over a stationary cell or another mobile cell when the relative velocity between the user equipment and the mobile cell is large.

At 55, signaling of an attach procedure may be performed. A radio link may be established between the user equipment and the base station or repeater relay of the cell selected at step 54. The attach procedure may comprise an RRC connection setup. The attach procedure may comprise establishing a public data network (PDN) connection.

Figure 4:
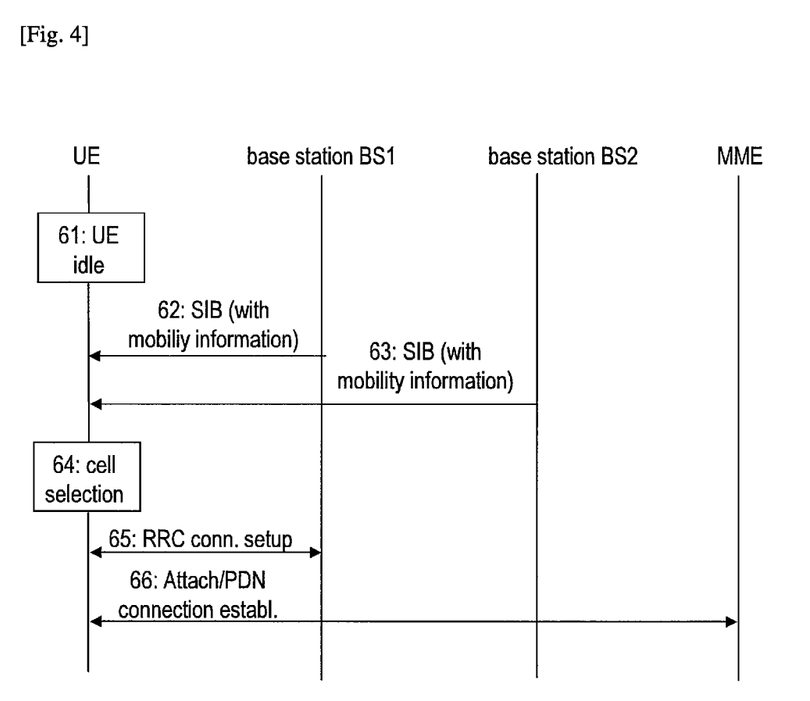
FIG. 4 is a diagram representing signaling in a method according to an embodiment.

FIG. 4 illustrates signaling in a system according to an embodiment. The user equipment may initially be in idle mode 61. While the user equipment is in the idle mode, a first base station may broadcast system information 62. The system information 62 may include mobility information. The mobility information may be selectively included in the system information when the base station is mobile. In other implementations, the mobility information may also be included in system information transmitted by a stationary base station. The system information 62 may include a system information block with mobility information. The mobility information may have any one of the various formats described with reference to FIG. 1 and FIG. 2 above. While the user equipment is in the idle mode, a second base station may broadcast system information 63. The system information 63 may include mobility information for the cell of the second base station. The system information 62, 63 may be broadcast repeatedly while the user equipment is in idle mode.

When an attach procedure is to be carried out for the user equipment, a cell selection 64 is performed. In the cell selection, a cell is selected for the user equipment to camp on. The mobility information received from at least one base station or repeater relay is used to determine the cell on which the user equipment shall camp. The cell selection may be triggered when the user equipment is to make a transition from the idle mode to a connected state, e.g. for a data or voice communication session.

An RRC connection setup 65 may be performed with the base station of the selected cell. The user equipment may perform an attach/packet data network (PDN) connection establishment 66.

As will be described in more detail with reference to FIG. 5 to FIG. 8 in the following, the user equipment may use the mobility information broadcast by a base station or repeater relay in a variety of ways. A hard cell prioritization may be performed in which cells are discarded as candidate cells depending on a comparison of the current velocity vector of the base station and the current velocity vector of the user equipment. A soft cell prioritization may be performed in which the selection of a cell is made more likely or less likely, depending on a comparison of the current velocity vector of the base station and the current velocity vector of the user equipment. The cell selection may optionally also be based on a historical mobility information of the base station.

While the cell selection techniques described in more detail with reference to FIG. 5 to FIG. 8 may be used when a user equipment becomes attached to the cellular communication network, the techniques may additionally or alternatively also be used for cell reselection, e.g. during handover.

While the cell selection techniques described in more detail with reference to FIG. 5 to FIG. 8 are described in the context of a mobile base station, the techniques may also be used for mobile repeater relays.

Figure 5:
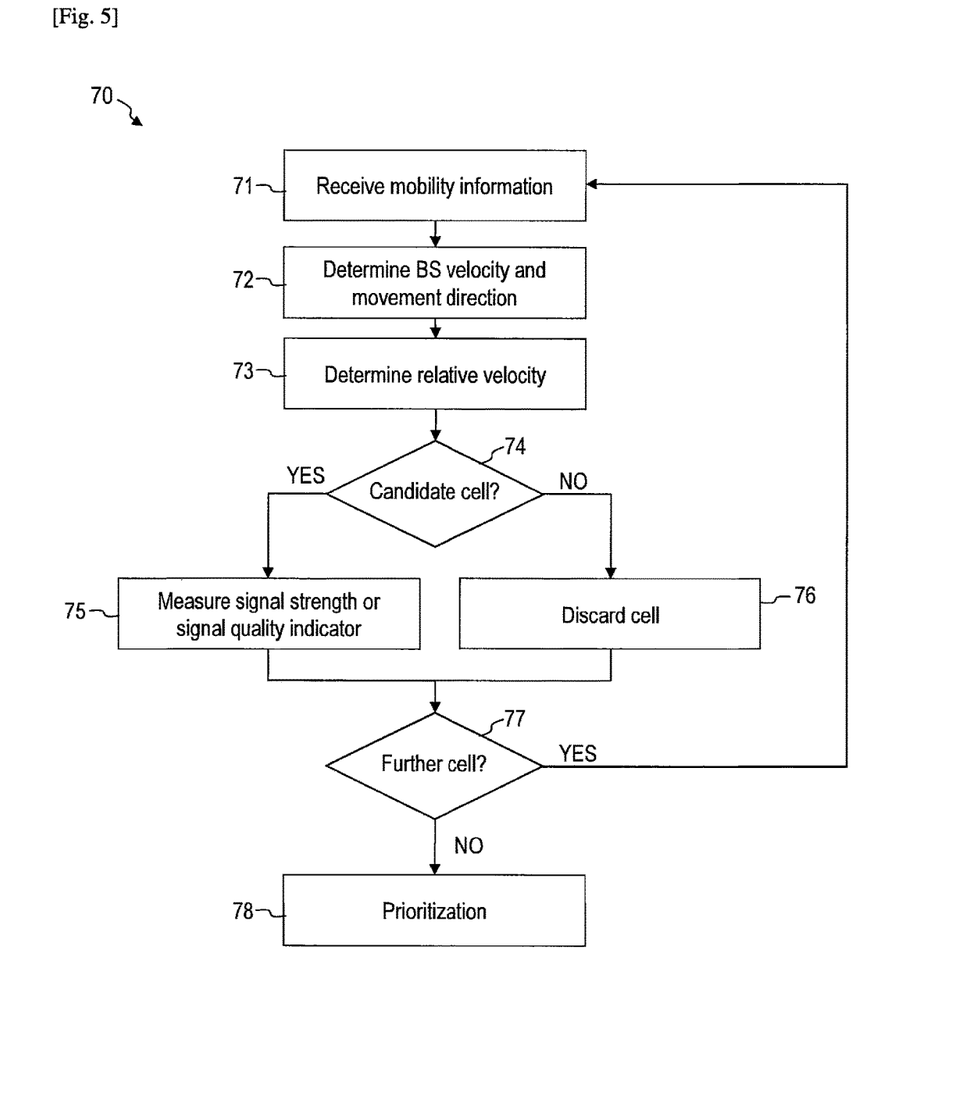
FIG. 5 is a flow chart of a method according to an embodiment.

FIG. 5 is a method 70 of selecting a cell according to an embodiment. The method 70 may be performed by a user equipment according to an embodiment.

At 71, the user equipment receives mobility information which may be broadcast by at least one base station. At 72, the user equipment processes the mobility information broadcast by a base station to determine the current velocity and direction of movement of the base station. The user equipment may read the current velocity and direction of movement from the broadcast mobility information. The user equipment may compute the current velocity and direction of movement from the broadcast mobility information, e.g. when the broadcast mobility information includes the location of the base station as a function of time. At 73, the user equipment may compute a relative velocity between the velocity vector of the base station and the velocity vector of the user equipment. Additionally or alternatively, the user equipment may compare a time-averaged historical velocity and direction of movement of the base station to the current velocity vector of the user equipment or to a time-averaged historical velocity vector of the user equipment to determine the relative velocity.

At 74, the user equipment may use the relative velocity to determine whether the cell for which the mobility information was broadcast is suitable as a candidate cell for the user equipment to camp on. A magnitude of the relative velocity may be compared to a threshold, for example.

At 75, if the cell for which the mobility information was broadcast is a suitable candidate cell for the user equipment to camp on, the user equipment may measure a signal strength indicator and/or a signal quality indicator for the cell. The signal quality indicator may be the Cell Selection quality value (typically indicated in dB), which is also referred to as Squal in the art. The signal strength indicator may be the Cell Selection RX level value (typically indicated in dB), which is also referred to as Srxlev in the art. The Cell Selection quality value and the Cell Selection RX level value may be measured in accordance with technical specification 3GPP TS 25.304, entitled "3rd Generation Partnership Project; Technical Specification Group Radio Access Network; User Equipment (UE) procedures in idle mode and procedures for cell reselection in connected mode (Release 11)". The Cell Selection quality value and the Cell Selection RX level value may be measured in accordance with technical specification 3GPP TS 25.304 V11.4.0 (2013-09), entitled "3rd Generation Partnership Project; Technical Specification Group Radio Access Network; User Equipment (UE) procedures in idle mode and procedures for cell reselection in connected mode (Release 11)".

At 76, if the cell for which the mobility information was broadcast is not a suitable candidate cell, e.g. because it moves with a high relative velocity relative to the user equipment, the cell may be discarded from a set of candidate cells. The discarding at 76 may be performed dependent upon one or several further conditions. For illustration, the mobile cell which moves at a high relative velocity relative to the user equipment may be selectively discarded only if there is at least one further candidate cell on which the user equipment could camp.

At 77, it is determined whether the user equipment is located in a coverage area of a further base station or repeater relay. If the user equipment is located in the coverage area of a further base station or repeater relay, steps 71 to 76 may be repeated for the further base station or repeater relay. If no further cells are available, the method may proceed to 78.

At 78, a prioritization may be performed among the cells which have not been discarded. The prioritization at step 78 may be performed based on the measured signal strength indicator and/or signal quality indicator of the cells. The relative velocity at which the base station(s) respectively move relative to the user equipment may additionally be taken into account in the prioritization at step 78. For illustration, the one of the cells may be selected at step 78 for which a target function has the maximum or minimum value. The target function may include both a term which depends on the signal strength indicator and/or signal quality indicator, and another term which depends on the relative velocity. A weighting factor may be used to adjust a relative weight between the term which depends on the signal strength indicator and/or signal quality indicator, and the other term which depends on the relative velocity, for example, so as to balance the influence of high signal strength and low relative velocity.

With the method of FIG. 5, cells may be discarded which move at a high velocity relative to the user equipment. This hard prioritization may be used to ensure that the user equipment never camps on a cell which moves at a rather high relative velocity relative to the user equipment, or is at least unlikely to camp on such a cell.

Alternatively or additionally, a soft prioritization may be performed which uses the relative velocity of the mobile cell relative to the user equipment as one of several criteria, as will be explained with reference to FIG. 6.

Figure 6:
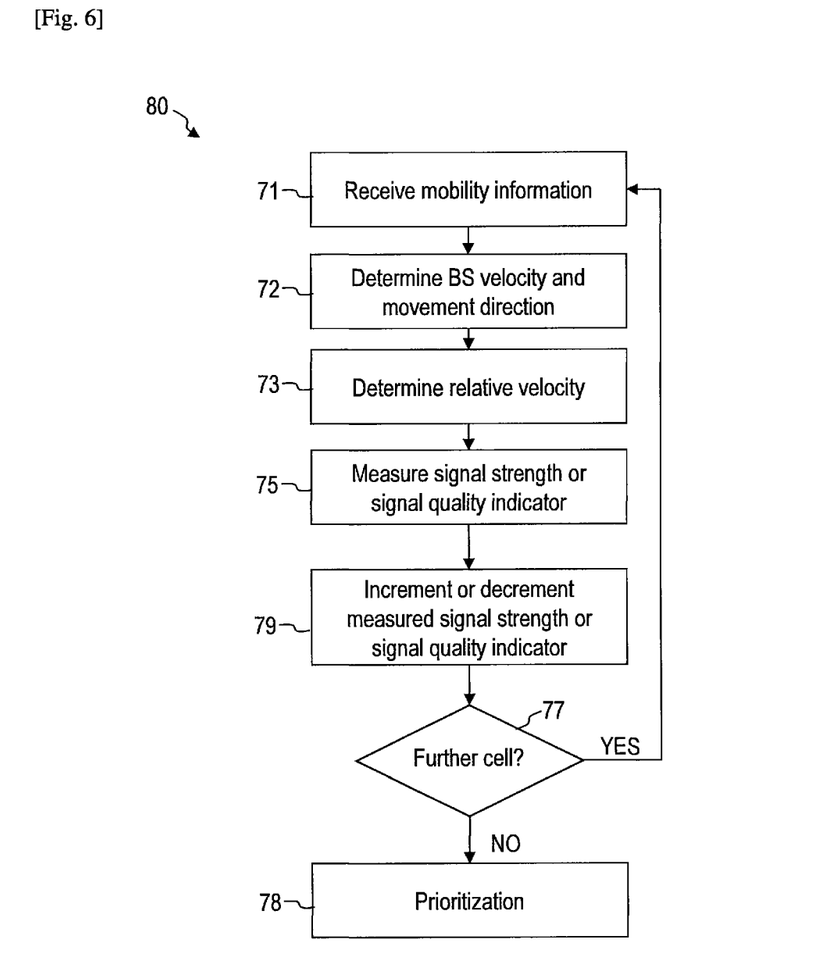
FIG. 6 is a flow chart of a method according to another embodiment.

FIG. 6 is a method 80 of selecting a cell according to an embodiment. The method 80 may be performed by a user equipment according to an embodiment.

At 71, the user equipment received mobility information which may be broadcast by at least one base station. At 72, the user equipment processes the mobility information broadcast by a base station. At 73, the user equipment may compute a relative velocity between the velocity vector of the base station and the velocity vector of the user equipment. These steps may be implemented as explained with reference to the method 70 of FIG. 5 above.

At 75, a signal strength indicator and/or signal quality indicator may be measured for the cell. The signal strength indicator and/or signal quality indicator may be configured as explained with reference to step 75 of the method 70 of FIG. 5 above.

At 79, the measured signal strength indicator and/or the measured signal quality indicator may be selectively incremented or decremented depending on the relative velocity between the base station of the mobile cell and the user equipment. For illustration, depending on a magnitude of the relative velocity, the measured signal strength indicator and/or the measured signal quality indicator may be decremented to make a selection of a cell less likely when it moves at a higher relative velocity. The decrement may be a function of the magnitude of the relative velocity vector. Alternatively or additionally, the measured signal strength indicator and/or the measured signal quality indicator may be incremented to make selection of a cell more likely when it moves at a small relative velocity relative to the user equipment. The increment may be a function of the magnitude of the relative velocity vector.

The output value resulting from step 79 is an incremented or decremented signal strength indicator and/or signal quality indicator, which will also be referred to as a movement-dependent signal strength indicator and/or movement-dependent signal quality indicator, because the increment or decrement depends on the movement between base station and user equipment.

At 77, it may be determined whether the user equipment is located in a coverage area of a further base station or repeater relay. If the user equipment is located in a coverage area of a further base station or repeater relay, the method may repeat steps 71, 72, 73, 75, 79, and 77 for the further base station or repeater relay. If no further cells are available, the method may proceed to 78.

At 78, a prioritization among the cells is performed. The prioritization may be performed based on the movement-dependent signal strength indicator and/or signal quality indicator determined at step 79. The prioritization algorithm may be the same as in conventional cell selection, e.g. as defined in technical specification 3GPP TS 25.304 referred to above. However, the input parameters are the movement-dependent signal strength indicator and/or signal quality indicator determined at step 79, which may include a movement-dependent increment or decrement.

With the method of FIG. 6, cells may be preferred depending on a combination of criteria involving the signal strength indicator and/or signal quality indicator as well as the relative velocity between base station and user equipment. This soft prioritization may be readily integrated into existing cell selection techniques.

Both in the method 70 of FIG. 5 and in the method 80 of FIG. 6, the prioritization at step 78 may be used for cell selection when the user equipment becomes attached to the communication network and/or for cell reselection. For illustration, the prioritization at step 78 may include that the user equipment reports signal strength indicators and/or signal quality indicators for various cells to the cellular communication network. The cells for which the reporting is performed may be selected in a velocity-dependent manner, as explained with reference to FIG. 5. The signal strength indicators and/or signal quality indicators may be incremented or decremented in a manner which depends on the relative velocity between the base stations and the user equipment, as explained with reference to FIG. 6. In either case, the mobility information may be used for cell reselection in the RAN or CN.

The identification of a mobile cell which moves in a manner that allows the user equipment to camp on the mobile cell for a longer time period may be performed in a variety of ways, taking into account the current velocity and/or historical velocity and the movement direction of the base station and the user equipment. Exemplary procedures will be described with reference to FIG. 7 and FIG. 8.

Figure 7:
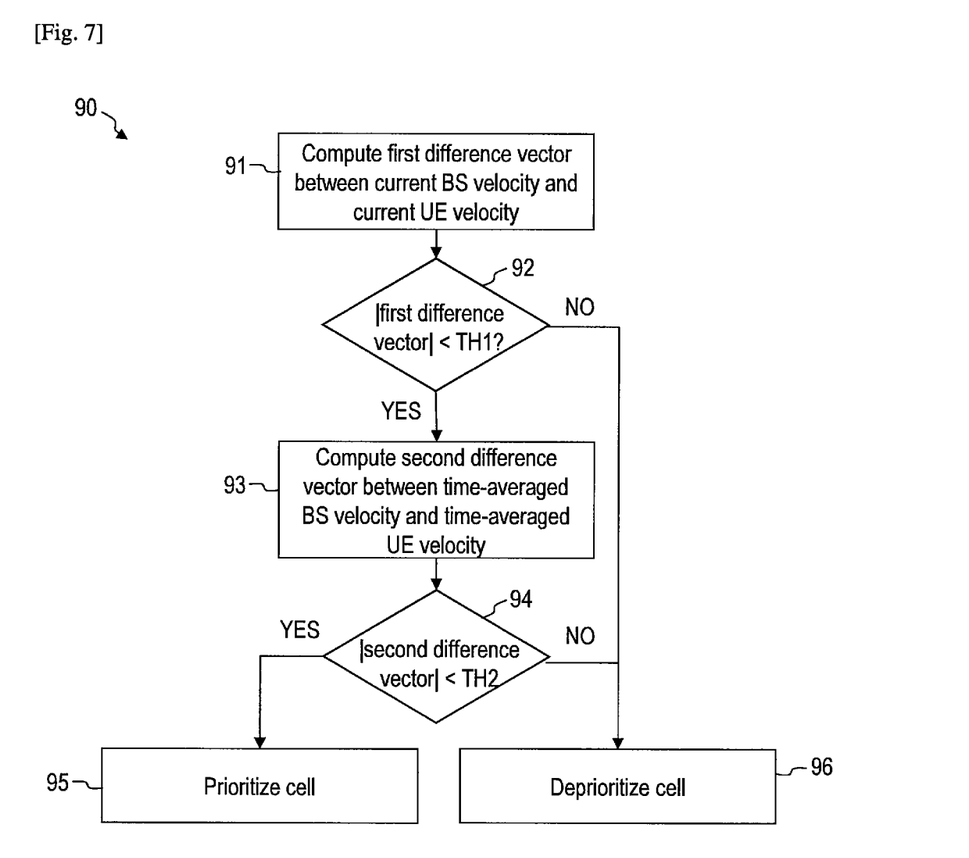
FIG. 7 is a flow chart of a procedure which may be performed by a user equipment according to an embodiment.

FIG. 7 is a flow chart of a procedure 90 which may be used in a method according to an embodiment. The procedure 90 may be performed by a user equipment according to an embodiment.

At 91, a first difference vector between a current velocity vector of the base station and a current velocity vector of the mobile terminal is computed. The current velocity vectors may respectively be the most recent velocity vectors determined before the mobility information is received at the user equipment from the base station.

At 92, a magnitude of the first difference vector may be compared to a first threshold TH1. If the magnitude is less than the first threshold, the method may proceed to step 93. Otherwise, the method may proceed to step 96 where the cell is deprioritized.

At 93, a second difference vector between a time-averaged velocity vector of the base station and a time-averaged velocity vector of the user equipment may optionally be computed. The time-averaged velocity vectors may respectively represent the average of the velocity vectors in a time-interval before the mobility information is broadcast. For illustration, the time-averaged velocity vectors may correspond to an average velocity vector averaged over a time interval of between 5 second to 30 seconds before the mobility information is generated and broadcast.

At 94, a magnitude of the second difference vector may be compared to a second threshold TH2. If the magnitude is less than the second threshold, the method may proceed to step 95 where the cell is prioritized. Otherwise, the method may proceed to step 96 where the cell is deprioritized.

At step 95, a cell may be prioritized if the magnitude of the relative velocity between the base station and the user equipment is less than a first threshold and, optionally, if the magnitude of the time-averaged historical relative velocity between the base station and the user equipment is less than a second threshold. The prioritization may be a hard prioritization, as explained with reference to the method 70 of FIG. 5. The prioritization may be a soft prioritization, as explained with reference to the method 80 of FIG. 6.

At step 96, a cell may be deprioritized if the magnitude of the relative velocity between the base station and the user equipment is equal to or greater than the first threshold, or, optionally, if the magnitude of the time-averaged historical relative velocity between the base station and the user equipment is equal to or greater than the second threshold. The deprioritization may be a hard deprioritization in which cells are discarded based on the mobility information, as explained with reference to the method 70 of FIG. 5. The deprioritization may be a soft deprioritization, as explained with reference to the method 80 of FIG. 6.

The historical information on the base station velocity in the past, e.g. a time-averaged velocity for a time interval in the past, may be evaluated in various ways in the cell selection. For illustration, the historical information may be used to determine a variance of the base station velocity, as exemplarily illustrated in FIG. 8. A cell which has a current velocity vector similar to the current velocity vector of the user equipment may be prioritized if the variance of the base station velocity is small, for example.

Figure 8:
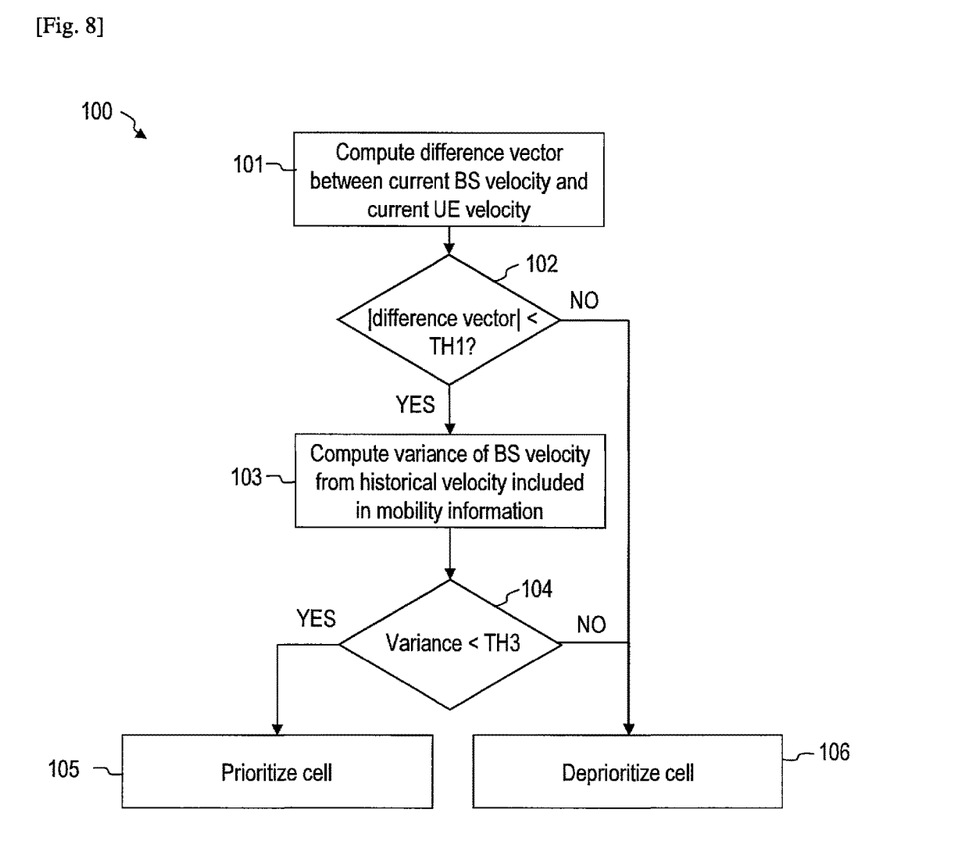
FIG. 8 is a flow chart of a procedure which may be performed by a user equipment according to an embodiment.

FIG. 8 is a flow chart of a procedure 100 which may be used in a method according to an embodiment. The procedure 100 may be performed by a user equipment according to an embodiment.

At 101, a first difference vector between a current velocity vector of the base station and a current velocity vector of the mobile terminal is computed. At 102, a magnitude of the first difference vector may be compared to a first threshold TH1. These steps may be implemented as described with reference to steps 91, 92 of the procedure 90 of FIG. 7.

At 103, a variance of the base station velocity may be computed based on the historical data included in the mobility information. For illustration, the current base station velocity may be compared to a time-averaged velocity of the base station to determine whether the current base station velocity is representative for the movement of the base station in a time interval which precedes the cell selection. Alternatively or additionally, the velocity vector information of the base station obtained for various points in time may be processed to compute the variance of the base station velocity.

At 104, the variance of the base station velocity may be compared to another threshold TH3. If the variance is less than the other threshold TH3, the procedure may proceed to step 105 where the cell is prioritized. Otherwise, the method may proceed to step 106 where the cell is deprioritized.

The prioritization at step 105 may be performed in any one of the ways described with reference to step 95 above. The deprioritization at step 106 may be performed in any one of the ways described with reference to step 96 above.

While embodiments of the invention have been described with reference to the drawings, various modifications and alterations may be implemented in other embodiments.

For illustration, while the user equipment may select a cell to camp on based on a comparison of a current velocity of the user equipment and a current velocity of a base station, the user equipment may alternatively or additionally perform a cell selection based on a comparison of a time-averaged velocity of the user equipment and a time-averaged velocity of the base station.

For further illustration, while a hard prioritization or a soft prioritization may be used for a mobility-aware cell selection, a combination of soft and hard prioritization schemes may also be employed.

The base station and/or repeater relay of a mobile cell may be installed in a vehicle. For illustration, the base station and/or repeater relay of a mobile cell may be installed in a public transportation vehicle. However, methods and devices according to embodiments may also be used in association with other mobile base stations and/or repeater relays.

The invention claimed is:

1. A method of selecting a mobile base station providing a mobile cell of a cellular communication network having a plurality of mobile base stations providing a plurality of mobile cells, the method comprising:
   receiving, by a user equipment, mobility information representing a time-dependent location change of a first mobile base station providing a first mobile cell of the plurality of cells, the mobility information comprising a time-averaged historical speed of the first mobile base station and a time-averaged historical direction of movement of the first mobile base station; and
   selecting the first mobile base station providing the first mobile cell of the plurality of cells for the user equipment to camp on,
   wherein the selecting comprises processing the mobility information comprising the time-averaged historical speed and direction of movement of the mobile base station to determine whether the user equipment is to camp on the first mobile cell, and camping by the user equipment on the first mobile cell.

2. The method of claim 1, wherein the user equipment receives the mobility information and selects the first mobile base station providing the first mobile cell while the user equipment is in idle mode.

3. The method of claim 1, comprising:
   monitoring user equipment movement data which represent a time-dependent location change of the user equipment,
   wherein said processing the mobility information comprises:
      performing a comparison of the user equipment movement data with the mobility information.

4. The method of claim 3, wherein the user equipment computes a relative velocity between the user equipment and the first base station or a repeater relay of the first mobile cell to determine whether the user equipment is to camp on the first mobile cell.

5. The method of claim 4, wherein the user equipment selects a cell different from the first mobile cell provided by the first mobile base station for the user equipment to camp on if the relative velocity exceeds a threshold.

6. The method of claim 3, wherein the user equipment compares a current speed and a direction of movement of the first mobile base station providing the first mobile cell with a current speed and a direction of movement of the user equipment to determine whether the user equipment is to camp on the first mobile cell.

7. The method of claim 3, comprising:
   measuring a signal strength indicator and/or a signal quality indicator for the first mobile cell; and
   selectively incrementing or decrementing the measured signal strength indicator and/or the measured signal quality indicator for the first mobile cell in dependence on a result of the comparison to generate a movement-dependent signal strength indicator and/or a movement-dependent signal quality indicator which is used to determine whether the user equipment is to camp on the first mobile cell.

8. The method of claim 7, wherein the user equipment reports the movement-dependent signal strength indicator and/or the movement-dependent signal quality indicator to the cellular communication network for cell reselection.

9. The method of claim 1, wherein the first base station or a repeater relay broadcasts the mobility information as a system information block (SIB).

10. The method of claim 9, wherein the first base station or the repeater relay broadcasts the mobility information, wherein the mobility information comprises:
    information on a current speed and direction of movement of the first base station or of the repeater relay, and
    information on a historical movement of the first base station or of the repeater relay in the past, including (i) a time-averaged historical speed of the first base station or the repeater relay and (ii) a time-averaged historical direction of movement of the first base station or the repeater relay.

11. A user equipment configured to attach to a cellular communication network having a plurality of mobile base stations providing a plurality of mobile cells, the user equipment comprising:
    a receiver configured to receive mobility information representing a time-dependent location change of a first mobile base station providing a first mobile cell of the plurality of cells; and
    at least one processing device coupled to the receiver and configured to select and camp on the first mobile base station providing the first mobile cell of the plurality of cells,
    wherein the at least one processing device is configured to determine, based on the mobility information, whether the user equipment is to camp on the first mobile cell,
    wherein the mobility information comprises: (i) a time-averaged historical speed of the first mobile base station providing the first mobile cell, and (ii) a time-averaged historical direction of movement of the first mobile base station providing the first mobile cell.

12. The user equipment of claim 11, wherein the user equipment is configured to receive the mobility information and to select the first mobile base station providing the first mobile cell while the user equipment is in idle mode.

13. The user equipment of claim 11, wherein the processing device is configured to determine whether the user equipment is to camp on the mobile cell by performing a comparison of user equipment movement data, which represent a time-dependent location change of the user equipment, with the mobility information.

14. The user equipment of claim 13, wherein the processing device is configured to compute a relative velocity between the user equipment and the first base station or a repeater relay of the first mobile cell to determine whether the user equipment is to camp on the first mobile cell.

15. The user equipment of claim 14, wherein the processing device is configured to select a cell different from the first mobile cell provided by the first mobile base station for the user equipment to camp on if the relative velocity exceeds a threshold.

16. The user equipment of claim 13, wherein the processing device is configured to compare a current speed and a direction of movement of the first mobile base station providing the first mobile cell with a current speed and a direction of movement of the user equipment to determine whether the user equipment is to camp on the mobile cell.

17. The user equipment of claim 13,
    wherein the user equipment is configured to measure a signal strength indicator or a signal quality indicator for the first mobile cell; and
    wherein the processing device is configured to selectively increment or decrement the measured signal strength indicator or the measured signal quality indicator for the first mobile cell in dependence on a result of the comparison to generate a movement-dependent signal strength indicator or a movement-dependent signal quality indicator which is used to determine whether the user equipment is to camp on the first mobile cell.

18. The user equipment of claim 17, wherein the user equipment is configured to report the movement-dependent signal strength indicator or the movement-dependent signal quality indicator to the cellular communication network for cell reselection.

19. The user equipment of claim 11, wherein the user equipment is configured to receive the mobility information from the first base station or a repeater relay of the first mobile cell, which broadcasts the mobility information as a system information block (SIB).

20. The user equipment of claim 19, wherein the user equipment is configured to receive the mobility information, wherein the mobility information comprises:
information on a current speed and direction of movement of the first base station or of the repeater relay, and
information on a historical movement of the first base station or of the repeater relay in the past, including (i) a time-averaged historical speed of the first base station or the repeater relay and (ii) a time-averaged historical direction of movement of the first base station or the repeater relay.

21. A system, comprising:
a cellular communication network comprising:
a plurality of base stations providing a plurality of cells including at least one first mobile base station providing a first mobile cell, wherein the first mobile base station or a repeater relay of the at least one first mobile base station providing the first mobile cell is and is configured to broadcast mobility information which represents a time-dependent location change of the first mobile base station or of the repeater relay, wherein the mobility information comprises a time-averaged historical speed of the at least one first mobile base station providing the first mobile cell, and a time-averaged historical direction of movement of the at least one first mobile base station providing the first mobile cell; and
a user equipment configured to attach to the cellular communication network, the user equipment comprising:
a receiver configured to receive the mobility information from the at least one first mobile base station providing the first mobile cell, and
at least one processing device coupled with the receiver and configured to select a cell from the plurality of cells to camp on,
wherein the at least one processing device is configured to determine, based on the mobility information, whether the user equipment is to camp on the at least one first mobile base station providing the first mobile cell,
wherein the user equipment selectively camps on the first mobile cell based on the at least one processing device determining that the user equipment is to camp on the at least one first mobile base station.

22. The system of claim 21, wherein the at least one first mobile base station or the repeater relay is configured to broadcast the mobility information as a system information block (SIB).

* * * * *